Feb. 26, 1924.
1,484,756
F. D. CHAPMAN
COOKER FOR CANNED MATERIAL
Filed Aug. 3, 1923     2 Sheets-Sheet 1
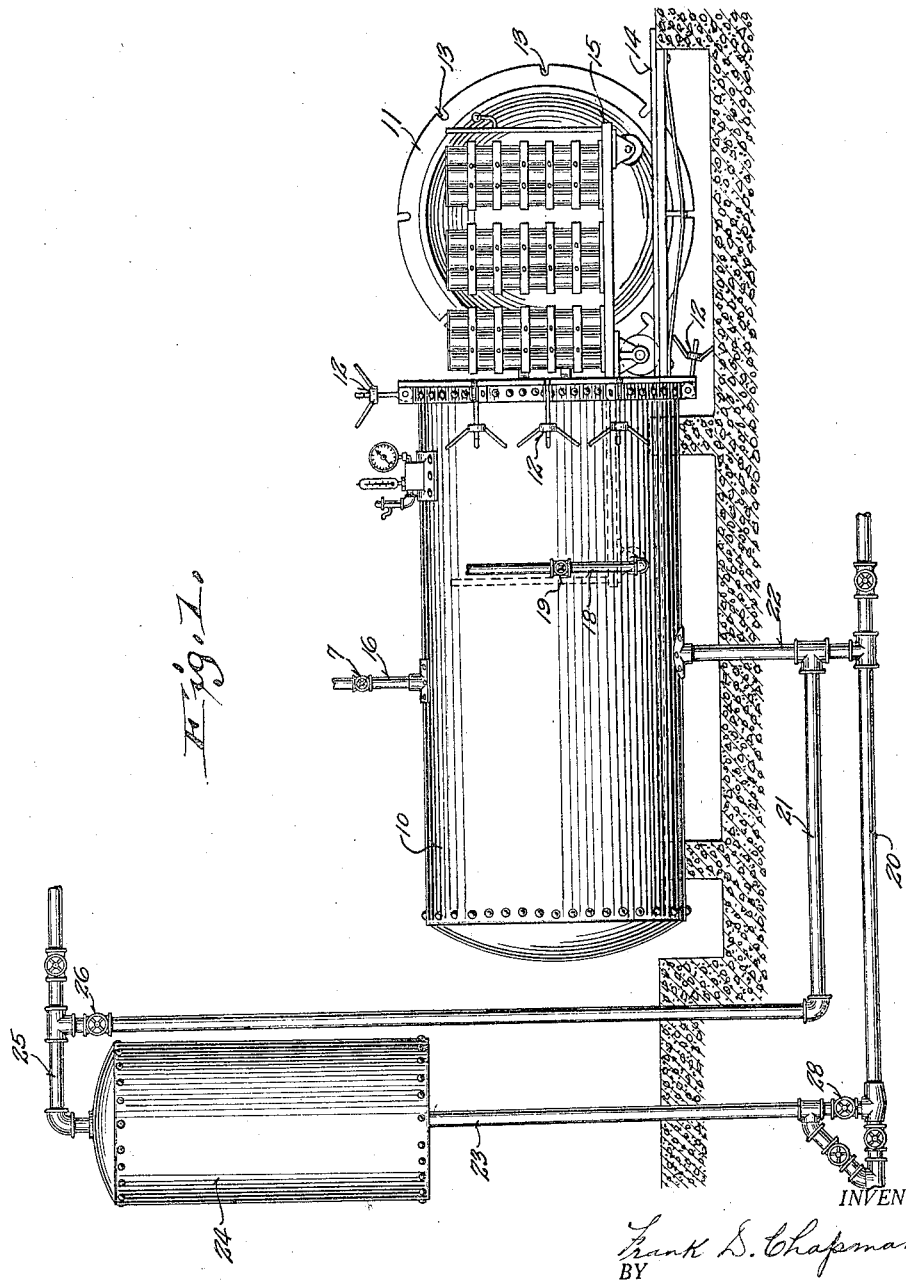
INVENTOR.
Frank D. Chapman.
BY Morsell, Keeney & Morsell
ATTORNEYS

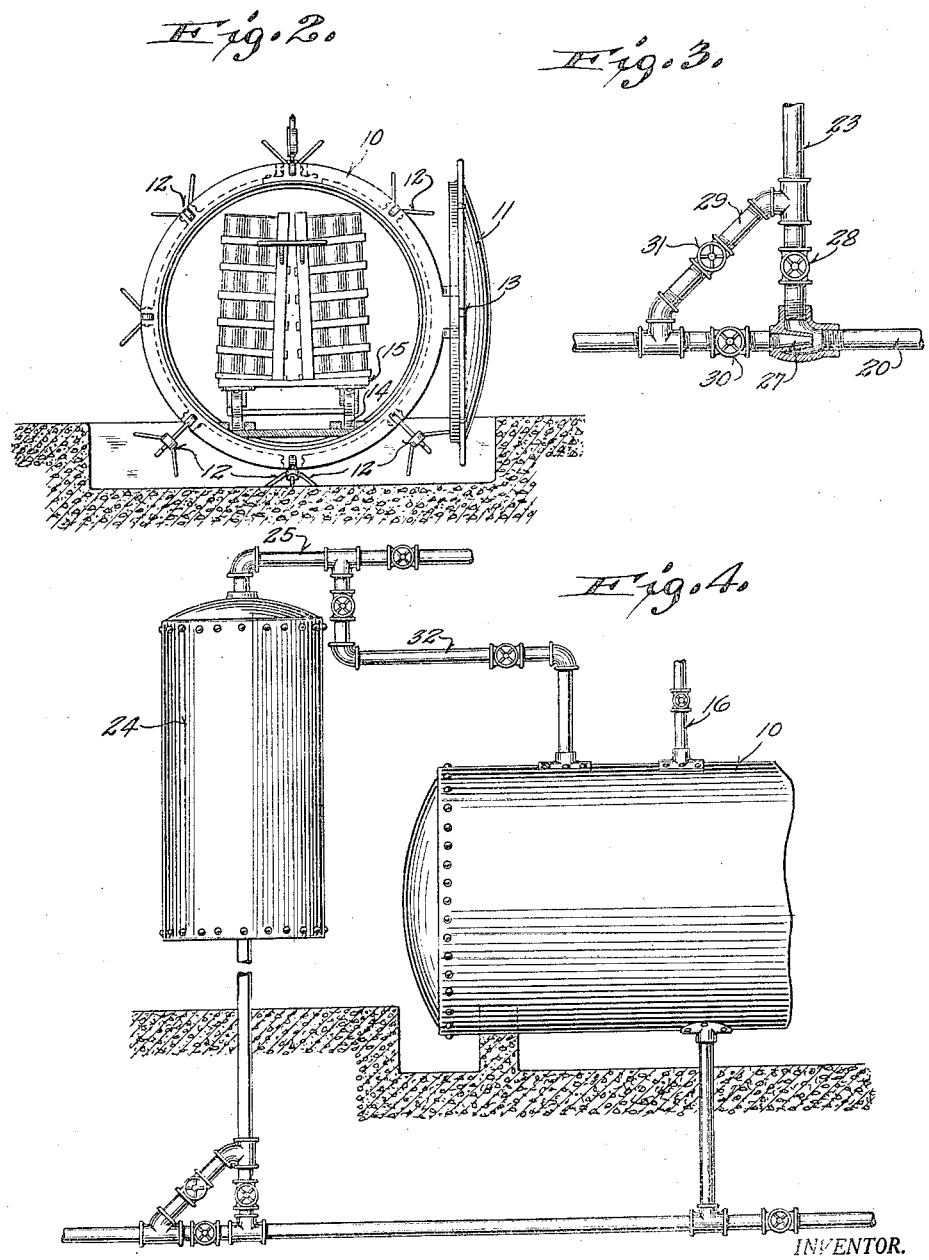

Patented Feb. 26, 1924.

1,484,756

UNITED STATES PATENT OFFICE.

FRANK D. CHAPMAN, OF BERLIN, WISCONSIN.

COOKER FOR CANNED MATERIAL.

Application filed August 3, 1923. Serial No. 655,532.

*To all whom it may concern:*

Be it known that I, FRANK D. CHAPMAN, a citizen of the United States, and resident of Berlin, in the county of Green Lake and State of Wisconsin, have invented new and useful Improvements in Cookers for Canned Material, of which the following is a description, reference being had to the accompanying drawings, which are a part of this specification.

This invention relates to a cooker used in the art of canning in which the cans containing the material to be processed or cooked are subjected to a cooking or other process.

In practice the contents of the vat or container are subjected to the action of heat, the heating medium usually employed being steam. In carrying out the process it is necessary and desirable that air be injected into the vat to prevent the creation of a vacuum therein during the condensation of the steam. According to the present invention, the air to be fed to the vat is compressed by the water which is employed as a cooling agent.

A further object is to provide a means for injecting air into the steam chamber for preventing the creation of a vacuum therein, when water or any other cooling medium is admitted in a strata at the bottom of the steam chamber.

The invention will be described more in detail with reference to the accompanying drawing, wherein an illustrative example, together with a modification of the invention are illustrated.

In the said drawings in which like reference characters indicate like parts in all the views:

Figure 1 is a side elevation of a process kettle for canning food, constructed in accordance with this invention;

Fig. 2 is an end elevation of the same;

Fig. 3 is a fragmentary detail elevational view of the injector means; and,

Fig. 4 is a fragmentary side elevation of a slightly modified form of construction.

Referring now particularly to Figs. 1 to 3 of the drawings, the first form of the invention will be described. In these figures it will be noted that the reference character 10 indicates the process kettle or vat which is provided with a hinged door 11, which may be secured in its closed position by means of pivoted bolts 12, engaging a plurality of slots 13, formed in the periphery of the door 11. A track 14 extends longitudinally into the kettle 10, and on this track there is mounted a truck 15, adapted to hold the cans of food or other material to be processed or cooked.

Steam is preferably supplied to the vat 10 by means of a pipe 16, provided with a valve 17, or by means of a pipe 18, controlled by a valve 19. A pipe 20 is provided, by means of which water is supplied to the tank 10, preferably at the bottom thereof, while through a pipe 21 air may also be supplied to the tank 10, the air and water entering the tank 10 through a pipe 22.

The pipe 20, which is connected to a source of water supply, is also connected by means of a pipe 23 to a tank 24, which is adapted to contain the air while it is being compressed, previous to the time that it is supplied to the vat 10, through the pipe 21. For this purpose the pipe 21 is connected by a pipe 25 to the upper end of the tank 24, the pipe 21 being provided with a valve 26.

At the point of connection between the pipes 20 and 23, there is provided an injector 27, a valve 28 being provided in the pipe 23 above the injector 27. At this point of connection there is also provided a diagonally arranged pipe 29, extending from the pipe 23 to the pipe 20, beyond the injector 27. A valve 30 is provided in the pipe 20, beyond the injector 27, and a valve 31 in the diagonally arranged pipe 29.

In operation, after the cans of material to be processed have been stored in the vat 10 and the door 11 thereof secured in its closed position, steam or hot water may be supplied to the vat 10 through either of the pipes 16 or 18 to cook or process the material within the vat. When the material has been sufficiently cooked, it is desirable to cool the different foods by different steps, but some require a more gradual cooling than others. During this cooling operation, it is desirable to prevent the formation of a vacuum within the vat, the vacuum being caused by the condensation of the steam. During the cooling process water is supplied to the vat through the pipe 20, and by closing the valve 31 on the pipe 29, the injector 27, forming a part of the pipe 20 will draw out any water which may be present in the tank 24, thus causing this tank to fill with air.

Inasmuch as the water is flowing into the vat 10 under pressure, and the valve 28 on the pipe 23, above the injector 27 is closed, the water will flow upwardly into the tank 24 and compress the air therein to the desired extent. After this air is compressed, it may be supplied to the vat through the pipe 21, and will thus compensate for any vacuum which might otherwise be formed in the vat 10 by reason of the cooling water coming in contact with the steam.

In Fig. 4 there is illustrated a modified form of construction, in which however, the operation is precisely similar with the exception, however that a pipe 32, corresponding to the pipe 21, connects directly with the upper portion of the tank 10 to supply air thereto. In other respects the modified construction is precisely similar to that just described.

When the cooking process is completed, the door of the vat is opened and the truck containing the cans of material is drawn outwardly and the cans removed therefrom, whereupon another batch of material may be again positioned within the vat and the process repeated.

From the foregoing it will be immediately apparent that there is provided an efficient and simple means for utilizing water employed as a cooling medium for the purpose of compressing air which may be subsequently employed to compensate for the vacuum formed when the water employed as the cooling medium comes in contact with the steam employed as the heating medium. Thus the operation and the cost of maintenance of the arrangement is materially reduced, and the results sought, efficiently obtained.

It should be understood that the invention is not limited to the illustrative examples herein shown and described, but reservation is made to make such changes as may come within the purview of the accompanying claims.

Having thus described the invention, what is claimed is:

1. The combination with a vat, of a tank, means for supplying a heating medium to said vat, means for supplying cooling water to said vat, means connecting said water supply means to said tank for compressing air therein and means for supplying said compressed air to said vat.

2. In an arrangement for cooking canned material, a vat adapted to receive the cans of material, means for supplying a heating medium thereto, means for supplying cooling water thereto, an air tank, means including an injector for connecting said water supply means to said tank, whereby said water will compress said air and means connecting said air tank to said vat.

3. In an arrangement for cooking canned material a vat adapted to receive the cans of material, a track in said vat, a truck mounted on said track and adapted to support the cans of material, means for supplying a heating medium thereto, means for supplying cooling water thereto, an air tank, means including an injector for connecting said water supply means to said tank, whereby said water will compress said air and means connecting said air tank to said vat.

4. In a cooking arrangement of the class described, a vat adapted to receive the material to be cooked, means for supplying a heating medium to said vat, a cooling water supply pipe connected to said vat, a tank, a pipe connecting said tank to said water pipe, an injector nozzle arranged at the connection between said pipes, a by-pass pipe connecting said pipes around said injector nozzle whereby water may be caused to flow into said tank to compress the air therein and means connecting said tank to said vat.

5. In a cooking arrangement of the class described, a vat adapted to receive the material to be cooked, a track in said vat, a truck mounted on said track and adapted to support the cans of material, means for supplying a heating medium to said vat, a cooling water supply pipe connected to said vat, a tank, a pipe connecting said tank to said water pipe, an injector nozzle arranged at the connection between said pipes, a by-pass pipe connecting said pipes around said injector nozzle whereby water may be caused to flow into said tank to compress the air therein and means connecting said tank to said vat.

In testimony whereof, I affix my signature.

FRANK D. CHAPMAN.